3,333,699
MAIN CONTROL VALVE FOR LIQUID
CONDITIONING APPARATUS
Willis H. Bliss, Manhattan Beach, and Paul G. Mueller, Jr., Pacific Palisades, Calif., assignors to Southern California Engineering Co., El Segundo, Calif., a corporation of California
Filed Aug. 20, 1964, Ser. No. 390,890
2 Claims. (Cl. 210—134)

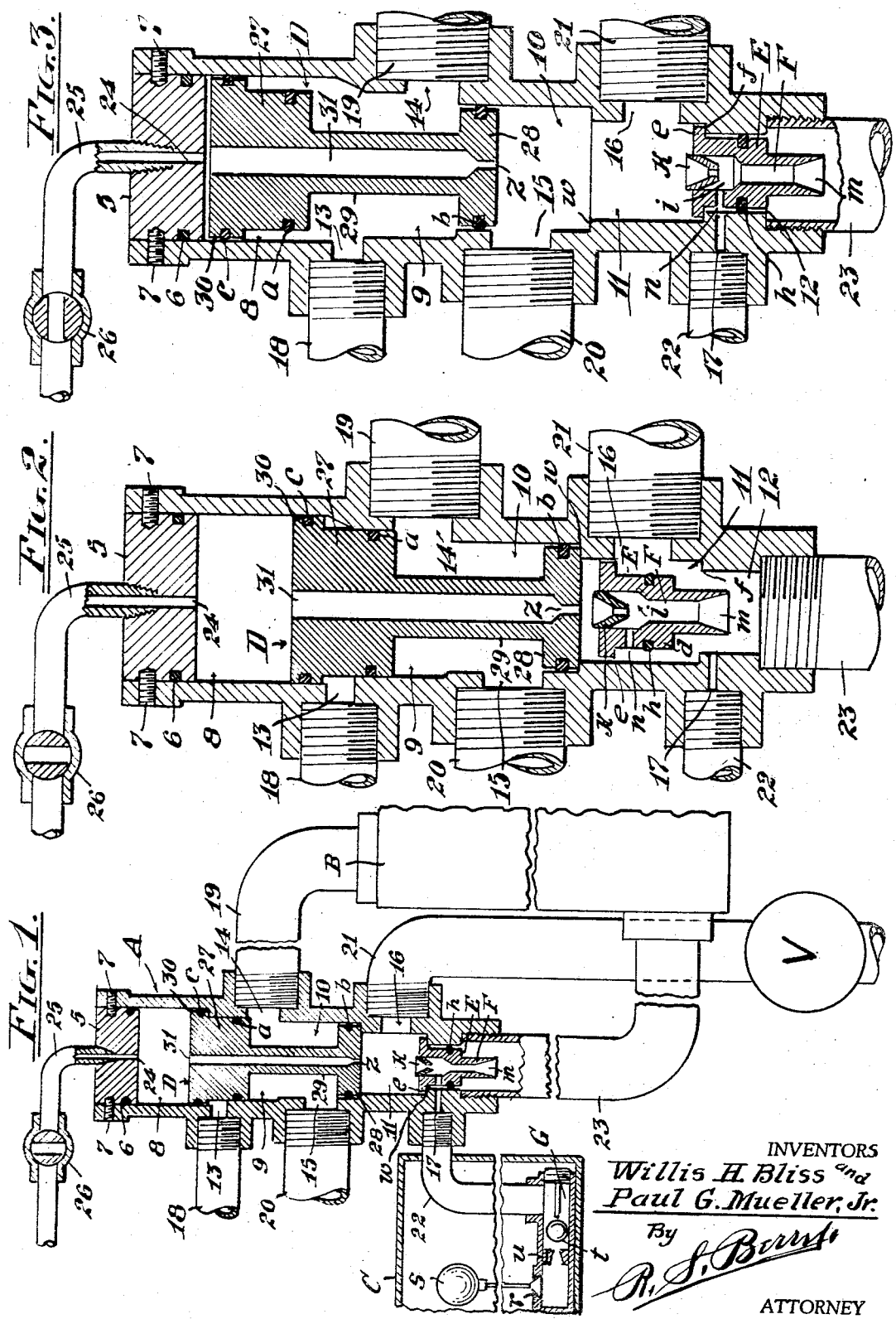

This invention relates to a main valve for controlling liquid conditioning apparatus and particularly pertains to a valve which is especially applicable for use in controlling the flow of liquids in water softening equipment. Such apparatus usually embodies a conditioning tank containing an ion-exchange bed through which water is passed to effect softening thereof, and also includes a regenerant reservoir from which brine is delivered at intervals to and through the conditioning tank. A main control valve is employed to alternately direct fresh water and brine to the tank, which valve, in turn, is controlled by a pilot valve, opening of which usually acts to relieve water pressure in a drain line and in a part of the main valve whereby differential pressure is caused to actuate an element in the main valve to thereby change the direction of flow between several ports. The liquid thus influenced by opening of the pilot valve as generally practiced is waste water which is passed to discharge through the pilot valve and drain line. Such water is contaminated by products produced in the water conditioning tank including dirt, rust, fine particles of resin and other precipitations, which products contribute to the early failure of the drain line control valve through increased friction, plugging of orifices, corrosive action, etc.

An object of the present invention is to provide a construction which will obviate the above recited objectionable features by directing only clean water through the pilot control valve in small quantity, and which construction provides an unrestricted drain line for delivery to waste of fouled products of regeneration from the conditioning tank and wherein the products of regeneration pass only through large ports and passages in the main valve directly to discharge.

A further object is to provide a main control valve embodying an injector in its ensemble, which comprises few parts of simple construction, which may be easily and quickly assembled and disassembled, and which valve is highly efficient in operation.

With the foregoing objects in view, together with such other objects as may subsequently appear, the invention is carried into effect as hereinafter described and claimed and illustrated by way of example in the accompanying drawing, in which:

FIG. 1 is a view in vertical section of the valve showing it in its normal service position and schematically depicting it as applied;

FIG. 2 is a view of the valve in vertical section showing the parts as disposed when in service, and FIG. 3 is a similar view showing the valve in its regenerating position.

Referring to the drawings in detail, A indicates the valve housing which is of general tubular cylindrical formation and normally disposed vertically. The upper end of the housing A is closed by a removable plug 5 fitted with a sealing ring 6 abutting the inner surface of the housing A. Set screws 7—7 threaded through the housing engage the plug 5 to detachably secure the plug in place. The housing A has a series of five axially aligned intercommunicating cylindrical chambers 8, 9, 10, 11 and 12 of successively diminishing diameters progressing downward from the upper end of the housing.

The side wall of the housing is provided with a plurality of ports including a port 13 leading from the chamber 8, a port 14 leading from the chamber 9, a port 15 leading from the chamber 10, a port 16 leading from the chamber 11 and a port 17 leading from the chamber 12 which chamber opens to the lower end of the housing.

A series of conduits are connected to the housing A consisting of a drain pipe 18 leading from the port 13, a conduit 19 leading from the port 14 and connecting with the upper end of a conditioning tank B, a liquid supply pipe 20 connecting with the port 15, a delivery conduit 21 leading from the port 16, a pipe 22 leading from the port 17 to a regenerant reservoir C, and a conduit 23 leading from the open lower end of the housing and connecting with the lower end of the tank B. The delivery conduit 21 is normally closed by one or more cut-off valves V as is common in water delivery systems.

The plug 5 has a passage 24 leading therethrough opening to the chamber 8 from which passage a drain pipe 25 leads to discharge through a normally closed pilot valve 26.

Reciprocally mounted in the chambers 8, 9 and 10 for longitudinal movement therein is a spindle valve D embodying vertically spaced upper and lower valve elements 27–28 interconnected by an axial stem 29. The upper valve element 27 slidably conforms to the cylindrical side wall of the chamber 9 while the lower valve element 28 slidably conforms to the side wall of the chamber 10; the valve element 27 controlling communication between the ports 13 and 14, while the valve element 28 controls communication between the port 15 and ports 14 and 16.

The upper valve element 27 has a peripherial flange 30 on its upper end which slidably conforms to the side wall of the upper chamber 8. Sealing rings $a$–$b$–$c$ are mounted on the perimeters of the valve elements 27–28 and flange 30.

Leading longitudinally through the spindle valve D is a passage 31 having a restricted orifice $z$ at its lower end, which passage affords open communication between the chamber 8 above the upper valve element 27 and the chambers beneath the lower valve element 28. The spindle valve D is normally disposed in its lowermost position as shown in FIGS. 1 and 2 with its lower end seated on a ledge $w$ at the juncture of the chambers 10–11, the valve being thus disposed under the urge of liquid pressure imposed on the upper end of the valve D, as will be later described.

Interposed between the lower chambers 11–12 is a combined check-valve and injector element E embodying a cylindrical body $d$ normally extending into the chamber 12 and having a peripheral flange $e$ on its upper end slidably conforming to the side wall of the chamber 11. The housing A has an internal shoulder $f$ at the juncture of the chambers 11–12 and extending between the ports 16–17, on which shoulder the flange $e$ is designed to seat when the element E is in its normal lowermost position, as shown in FIGS. 1 and 3, wherein the body $d$ of the element E occupies the chamber 12. A sealing ring $h$ encompasses the body $d$ of the element E which abuts the side wall of the chamber 12 when the element E is disposed in the chamber 12.

Extending axially through the elements E is an injector F embodying an intake cavity $i$ into which projects a convergent nozzle $k$ leading from the chamber 11 and opening downward into the cavity $i$ opposite a venturi throat $m$ having its divergent discharge outlet presented to the open end of the conduit 23 at the lower end of the valve housing A. An aperture $n$ leads from the cavity $i$ transversely of the body $d$ between the flange $e$ and the sealing ring $h$ to a clearance space surrounding the body $d$ opposite the port 17 when the element E is in its lowermost position, whereby, when the element E is in such position and liquid is directed downward through the injector F, brine will be inducted from the reservoir C through the pipe 22 and delivered to the tank B through the conduit 23.

The connection between the pipe 22 and the reservoir C is one commonly employed in automatic water softeners wherein the reservoir C contains a predetermined volume of brine constituting a regenerant.

Such connection embodies a horizontally extending tubular valve housing G submerged in the liquid in the reservoir, with one end of which the pipe 22 connects. The other end of the housing G has an intake normally closed by a valve $r$ controlled by a float $s$ when the reservoir is filled with a predetermined volume of liquid. Interposed between the valve $r$ and the end of the housing G connected to the pipe 22 is a ball check-valve $t$ opening toward the pipe 22. A restricted by-pass port $u$ leads across the check-valve $t$ to afford back flow of liquid from pipe 22 and valve A to refill the reservoir C through the valve G.

In the operation of the invention, the pilot valve 26 is normally closed and the spindle valve D is disposed in its lower-most service position, as shown in FIGS. 1 and 2, in which position the upper valve element 27 closes the port 13 to the drain pipe 18, and the lower valve element 28 closes communication between the intermediate chambers 10 and 11. The chambers 9 and 10 then afford communication between the ports 14–15 around the stem 29 of the spindle valve D. When the parts are thus disposed liquid under pressure is delivered from the supply pipe 20 through port 15, chambers 9–10, port 14, conduit 19, to the upper end of the conditioning tank B. On opening a normally closed valve V in the delivery conduit 21 to discharge, water will flow from the supply pipe 20 through port 15, chamber 10, port 14, conduit 19 into the upper end of the tank B and will then pass downward through the tank B through a bed of conditioning material therein; the liquid being discharged from the lower end of the tank through the conduit 23 and delivered into the lower end of the valve housing A where the flowing liquid will lift the check valve element E off its seat, as indicated in FIG. 2, thereby permitting liquid flow through chambers 12–11 and port 16 into and through the delivery conduit 21 to discharge.

During this operation water from the source of supply under pressure will be directed downwardly through the tank B thence through conduit 23 and upwardly through the passages of the injector F and thence upwardly through the passage 31 of the valve D into the chamber 8 where the pressure of then conditioned water will be imposed on the upper end of the valve D so as to thrust it downward into its seated position on the ledge $w$, as shown in FIGS. 1 and 2, in opposition to upward pressure imposed on the under side of the valve elements 27–28. This action is accomplished by reason of the area of the surface of the upper end of the valve D exceeding the effective areas of the underside of the valve elements 27–28.

On opening the pilot valve 26 conditioned water will initially flow to discharge from the chamber 8 through the conduit 25, thereby relieving the pressure above the valve D so that liquid pressure then imposed on the underside of the valve D will elevate it to its uppermost position shown in FIG. 3, thereby causing the lower valve element 28 to be interposed between the ports 14 and 15 to close the communication between the ports 14 and 15 and open communication between the supply port 15 and the chamber 11 so as to direct a flow of supply water downwardly through the injector F, through the conduit 23 and upwardly through the tank B to discharge through the conduit 19, port 14, chambers 9–8, then open port 13, and drain pipe 18; the ports 14 and 13 being in open communication between the valve elements 27–28.

The ports 15 and 16 are then in open communication across the chamber 11 whereby supply water will be directed from the supply pipe 20 to the delivery conduit 21 when the latter is opened to discharge.

Relief of pressure above the main valve D is maintained throughout the period during which the pilot valve 26 remains open, such relief of pressure being faster than liquid pressure can be re-supplied through the restricted intake orifice $z$ of passage 31 in the valve D.

As the lower valve element 28 passes and opens the inlet port 15, only fresh clean supply water flows through the spindle valve D and through the pilot valve 26; such flow continuing at a slow rate throughout the regeneration period which endures while the pilot valve 26 remains open. Pressure of the supply water in the chamber 11 will act to seat the check valve E on the shoulder $f$ whereupon water will flow through the injector F which will act to induct brine through the port 17 from the pipe 22 by the discharge of a jet through the nozzle $k$ across the cavity $i$ into the venturi throat $m$ creating a negative pressure in the cavity so as to draw brine from the pipe 22 into the cavity $i$ through the aperture $n$ and port 17. The brine thus delivered to the injector F is mixed with the water passing through the nozzle $k$ and venturi throat $m$ and is delivered through the conduit 23 into the lower end of the tank B. This mixture passes up through the tank B and flows from the upper end of the latter through conduit 19, port 14, chambers 9–8 and port 13 to discharge through the drain pipe 18.

The regeneration period above described is commenced, as stated, by opening of the pilot valve 26 and continues until a measured amount of the brine in the reservoir C has been inducted from the latter, which point is determined by the level of the brine in the reservoir C falling to a point where air will be drawn into the valve G thus terminating the regeneration period as is common in automatic water softening apparatus. During the regeneration period valve D is maintained in its upper position by pressure conditioned water from the tank B imposed on the lower end of the valve. A small volume of such water flows slowly to discharge through orifice $z$, passages 31–24, drain pipe 25 and open pilot valve 26.

At the termination of the regeneration operation the pilot valve 26 is closed, whereupon water will continue to pass slowly through the restricted orifice $z$ and passage 31 of the main valve D thereby building up pressure above the upper end of the valve. Due to the superior area of the upper end of the valve D, this pressure forces the valve D down to its service position, thereby closing the drain port 13 and connecting the source of water supply to the upper end of the tank B through the ports 14–15 and conduit 19, and at the same time blocking the inlet port 15 from the discharge port 16, thus re-establishing pressure in the tank B and permitting the flow of conditioned water to the delivery line from the lower end of the tank B through the conduit 23, chambers 12–11 and port 16. As before stated such flow occurs on opening a valve in the delivery line to discharge liquid therefrom. Pressure of the flowing water into the chamber 12 lifts the injector check valve E off its seat as indicated in FIG. 2. In the meantime conditioned water will flow from the tank B and conduit 23 through the port 17, pipe 22 and valve housing G into the reservoir C to refill the latter with water which is converted into brine in the usual manner. This back flow of water through the port 17 may occur while the check-valve E is in either its open or closed position, since, when the valve E is open, water will enter the port 17 directly from the chamber 12 and when closed water will be delivered into the port 17 through the passage $m$ and aperture $n$ of the injector F. The back-flow will terminte when the float S in the reservoir C is elevated by the rising level of water in the reservoir to a point to effect closing of the valve $r$ to thereby block delivery of water to the reservoir.

From the foregoing it will be seen that actuation of the reciprocal main control valve D from its lower or service position to its upper regeneration position is effected on opening the pilot valve 26 by pressure of conditioned water from the tank B imposed on the underside of the lower valve element 28 coupled with pressure of supply water from the supply pipe 20 on the underside of the upper valve element 27, and that actuation of the valve D from its upper regenerating position to its lower service position is effected on closing the pilot valve 26 by pressure imposed on the upper end of the valve by conditioned water delivered from the tank B into the chambers in the valve housing A beneath the lower end of the end of the valve D and directed into the chamber above the valve D through the passage 31 in the latter.

An important feature of the invention resides in the arrangement whereby the above recited actuation of the main control valve D controlled by the pilot valve is effected through the medium of clean conditioned water directed to the pilot valve, instead of contaminated waste water as generally practiced in similar water conditioning apparatus.

By mounting the injector F in the check-valve E, instead of exteriorly of the main valve structure as commonly practiced, the employment of various pipe connections is obviated and furthermore the injector is rendered self-cleaning in that water flow therethrough is effected in both directions. Such arrangement is further advantageous in that the injector is subject to ready removal for repair or replacement, if need be, and is the main valve D and the check-valve E, on removal of the plug 5 from the upper end of the housing A.

Another feature of the invention resides in the provision of the passageway through the check valve and injector element E afforded by the injector F, serving not only as an injector, but also serving, when the element E is in its closed position and functioning as a check-valve, to afford a communcation through the closed element, whereby water under pressure will flow from the conditioning tank B through the conduit 23 upwardly through the element E into the upper end of the chamber 11 and through the passage 31 in valve D into the chamber 8 above the valve to thereby force said valve to its lowermost position on closing the pilot valve 26, as indicated in FIG. 1.

Accessibility of the injector F enables quick and ready inter-change of nozzle Venturi combinations to accommodate the injector to various tank sizes, regeneration speed, water pressure variations or other reasons.

While the invention has been described as applied to water softening equipment it may be employed in apparatus for conditioning other liquids and/or involving the use of a liquid regenerative liquid other than brine, and while a specific construction has been shown and described, it is subject to variations within the scope of the appended claims without departing therefrom.

We claim:

1. In a liquid conditioning apparatus embodying a conditioning tank, a regenerant reservoir, a main control valve housing having a multiple of ports including:
    (a) an intake port connected to a source of liquid supply under pressure;
    (b) discharge port connected to a delivery conduit;
    (c) a port connected to a drain pipe;
    (d) a port connected to the upper end of said tank; and
    (e) a port connecting with said regenerant reservoir;
    (f) a conduit leading from the lower end of said housing to said conditioning tank;
said housing having a chamber from which said last named port leads, a conduit connecting said chamber to the lower end of said tank, and a reciprocal main central spindle valve (D) in said housing adapted to be disposed in either an upper or lower position, said valve when in its lower position closing the port connected to said drain pipe and opening said intake port to the port connected to the upper end of said tank and closing said intake port to said discharge port while opening said discharge port to said chamber and the conduit connecting said chamber to the lower end of said tank, and said valve when in its upper position opening the port connected to the drain pipe to the port connected to the upper end of said tank, and opening said intake port to said discharge port, an upwardly opening check valve in said chamber arranged between said discharge port and the port connecting with said regenerant reservoir; the improvement comprising a means closing the upper end of said housing having a passage leading therethrough for connection with a drain pipe fitted with a normally closed pilot valve, said spindle valve (D) having a restricted passage extending the length thereof and leading longitudinally there-through affording open communication between said passage and said conditioning tank through said check valve and conduit; said check valve having a passage there-through and said spindle valve embodying an upper valve having a peripheral end flange fitted with a sealing ring (c) slidably conformable to said housing.

2. In a liquid conditioning apparatus embodying a conditioning tank, a regenerant reservoir, a main control valve housing having a multiple of ports including:
    (a) an intake port connected to a source of liquid supply under pressure,
    (b) discharge port connected to a delivery conduit,
    (c) a port connected to a drain pipe,
    (d) a port connected to the upper end of said tank; and
    (e) a port connecting with said regenerant reservoir;
said housing having a chamber from which said last named port leads, a conduit connecting said chamber to the lower end of said tank, and a reciprocal main central spindle valve in said housing adapted to be disposed in either an upper or lower position, said valve when in its lower position closing the port connected to said drain pipe and opening said intake port to the port connected to the upper end of said tank and closing said intake port to said discharge port while opening said discharge port to said chamber and the conduit connecting said chamber to the lower end of said tank, and said valve when in its upper position opening the port connected to the drain pipe to the port connected to the upper end of said tank, and opening said intake port to said discharge port, an upwardly opening check-valve in said chamber arranged between said delivery port and the port connecting with said regenerant reservoir; the improvement wherein said spindle valve has a passage leading longitudinally therethrough whereby liquid may pass through the entire length of said valve from the lower end of said valve to and from the upper end thereof, said valve housing having a chamber above said valve in which liquid passing through said passage may accumulate under pressure and thereby thrust said valve downward to its lowermost position, a drain pipe leading from said last named chamber, and a pilot valve in said drain pipe adapted to open or close said pipe to discharge.

References Cited

UNITED STATES PATENTS

| | | | |
|---|---|---|---|
| 2,715,098 | 8/1955 | Whitlock | 137—624.18 X |
| 2,863,559 | 12/1958 | Schulze | 210—191 X |
| 3,138,553 | 6/1964 | Mollring | 210—191 X |

SAMIH N. ZAHARNA, *Primary Examiner.*

REUBEN FRIEDMAN, *Examiner.*

F. S. PEAR, *Assistant Examiner.*